(12) United States Patent
Chen

(10) Patent No.: US 6,193,411 B1
(45) Date of Patent: Feb. 27, 2001

(54) CALIBRATOR FOR CONTACT AND NON-CONTACT THERMOMETER

(75) Inventor: Shen-Jen Chen, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/328,779

(22) Filed: Jun. 9, 1999

(30) Foreign Application Priority Data

Feb. 25, 1999 (CN) .................................. 88203082

(51) Int. Cl.[7] .......................... G01K 15/00; G01K 17/20; G01K 19/00
(52) U.S. Cl. .............. 374/2; 374/208; 374/209; 374/210; 374/1
(58) Field of Search ................ 374/2, 208, 209, 374/210, 164, 172, 173, 1

(56) References Cited

U.S. PATENT DOCUMENTS

| | | | |
|---|---|---|---|
| 3,348,408 | * | 10/1967 | Engborg . |
| 3,350,915 | * | 11/1967 | Staffin ........................ 374/3 |
| 3,435,622 | * | 4/1969 | Barton et al. ............... 374/3 |
| 3,499,294 | * | 3/1970 | Barton et al. ............... 374/3 |
| 3,631,708 | * | 1/1972 | Ensor ........................ 374/2 |
| 5,820,261 | * | 8/2000 | Yam .......................... 374/2 |
| 6,056,433 | * | 5/2000 | Yam .......................... 374/2 |
| 6,086,245 | * | 7/2000 | Yam .......................... 374/2 |
| 6,106,148 | * | 8/2000 | Moslehi et al. ............ 374/1 |

FOREIGN PATENT DOCUMENTS

0148552 * 1/1962 (SU) ......................... 374/2

* cited by examiner

*Primary Examiner*—G. Bradley Bennett
*Assistant Examiner*—Gail Verbitsky
(74) *Attorney, Agent, or Firm*—Kenyon & Kenyon

(57) ABSTRACT

The present invention relates to a calibrator for contact and non-contact thermometers, comprising a metallic body which comprises two opposite end surfaces, wherein at least a first type of hole which is drilled into the metallic body for the insertion of a temperature control probe, and at least a second type of hole for the insertion of a temperature probe are mounted on one end surface; and the other end surface is coated with material to perform as radiative source; a heating device, for heating the metallic body, and temperature control device, for controlling the heating power of the heating device and for controlling the temperature of the metallic body. The present invention could be utilized to calibrate both contact and non-contact thermometers. The objective of integrating two functions into one device and thereby saving costs and space could be achieved.

9 Claims, 1 Drawing Sheet

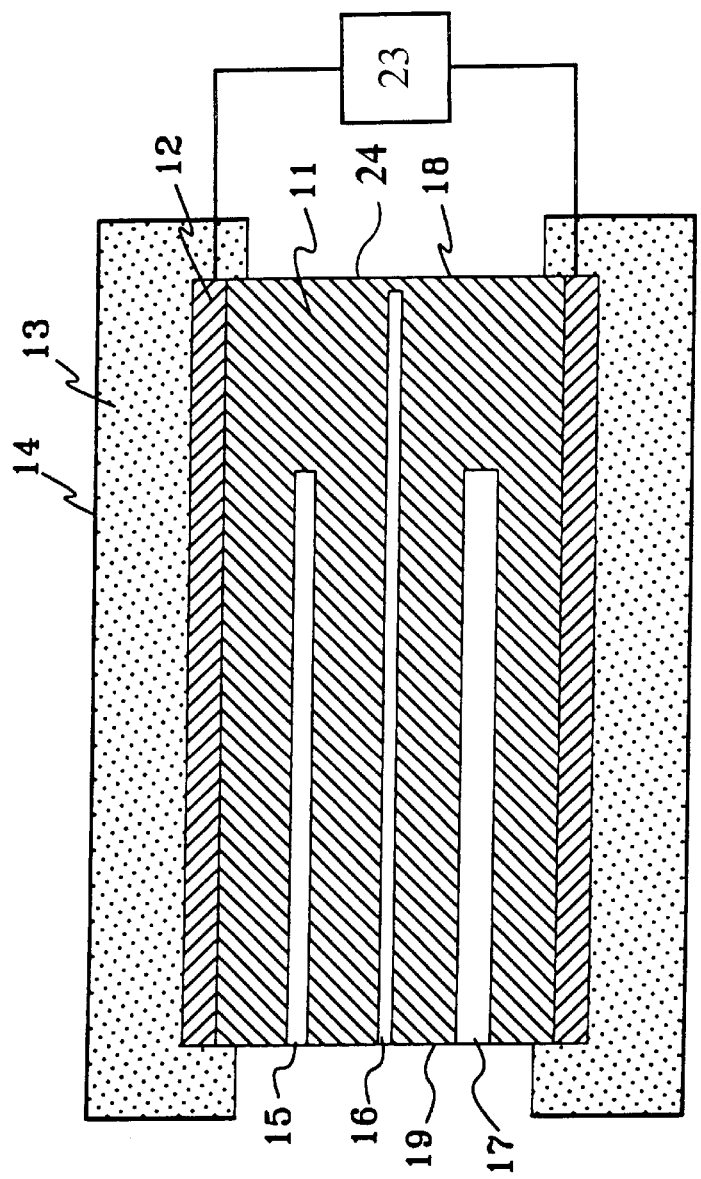
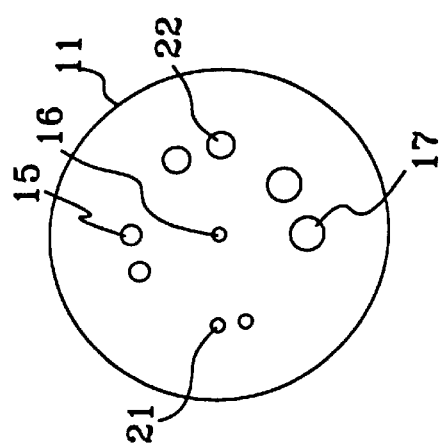
FIG.1
FIG.2

CALIBRATOR FOR CONTACT AND NON-CONTACT THERMOMETER

BACKGROUND OF THE INVENTION

1. Field of the Invention

The present invention relates to a calibrator for thermometers and, more specifically, relates to a double-duty calibrator for contact and non-contact thermometers.

2. Description of the Related Art

The measurement and control of temperature is widely applied and plays an important role in industry. Thermometers are classified into contact and non-contact types based on the method of utilization. There are various kinds of contact thermometers, such as resistance thermometers, thermocouple and liquid-in-glass thermometers. The non-contact thermometers are mainly directed to radiation thermometers.

Thermometers must be calibrated periodically in order to obtain accurate temperature measurement and control. Calibrators for contact and non-contact thermometers differ basically because of different utilization and measuring ranges. Thus, two sets of calibrators are required for calibrating contact and non-contact thermometers respectively. There are several disadvantages for purchasing two sets of calibrators, for example, involving high cost and requiring more space.

SUMMARY OF THE INVENTION

An object of the present invention is to provide a novel and practical calibrator for contact and non-contact thermometer. The present invention performs double-ditty and is convenient to use.

Another object of the present invention is to provide a novel and practical calibrator for contact and non-contact thermometers thus avoiding the necessity of purchasing two sets of calibrators and there by reducing costs.

A further object of the present invention is to provide a novel and practical calibrator for contact and non-contact thermometers that saves space.

To achieve the objectives mentioned above, the present invention discloses a novel calibrator for thermometers. In one embodiment of the present invention, a cylindrical shape body is provided. One surface of the cylinder is coated with a heat-resistant and high emissivity coating as a standard radiation source for calibrating non-contact thermometers, and the other surface of the cylinder is drilled with several holes for insertion of various sizes of contact thermometers in order to calibrate contact thermometers. No matter contact or non-contact type, the thermometers can be calibrated by the calibrator of the present invention. Thus, the expense in equipment and space could be saved.

The present invention will be elucidated with reference to the accompanying drawings which, however, are being presented for illustrative purposes only.

BRIEF DESCRIPTION OF THE DRAWINGS

FIG. 1 depicts the profile of the calibrator for contact and non-contact thermometers according to the present invention.

FIG. 2 depicts the bottom end of the metallic cylinder of FIG. 1.

DETAILED DESCRIPTION OF THE INVENTION

In order to achieve the objects mentioned hereinbefore, the present invention discloses a calibrator for contact and non-contact thermometers, comprising:

a metallic body, comprising two opposite end surfaces, wherein at least a first type of hole which is drilled into the metallic body for insertion of temperature control sensor rod, and at least a second type of hole for insertion of temperature sensor rod on one end surface; and the other end surface is coated with material to perform as a radiation source;

a heating device, for heating the metallic body; and a temperature control device 23, for controlling the heating power of the heating device and for controlling the temperature of the metallic body.

According to the present invention, the radiation source is made of heat-resistant and high emissivity coating. The first type of hole is located at the center of one end surface and is about 1 to 7 mm away from the other end surface. The depth of the first type of hole is close to the length of the metallic body. In one embodiment of the present invention, the metallic body is cylindric. The depth of the second type of hole is one-third to three-fourths of the length of the metallic body. The calibrator farther comprises a thermal insulating layer surrounding the heating device and a housing for fixing the metallic body.

One embodiment according to the present invention is shown in FIG. 1. The calibrator includes a metallic cylinder 11, a heating device 12, a thermal insulating layer 13, a housing 14 and a temperature control device (not shown in the figure). The metallic cylinder 11 is isothermal whenever it is in the temperature equilibrium condition because of the excellent thermal-conductivity. There is a radiative source 22 on metallic cylinder surface 18. The radiative source comprises of heat-resistant and high emissivity material (for example EP-10 of Wahl Instrtunents Inc., emissivity of 0.95 and Max. temperature: 1500° F.; THI-1B of TASCO Co. Ltd., emissivity of 0.94 and Max. temperature: 500° C.). The radiative source is utilized for calibrating non-contact thermometers.

A hole 16 is drilled at the center of metallic cylinder surface 19. The depth of the hole 16 is about 3 mm less than the length of the metallic cylinder 11. The hole 16 is used for the insertion of a temperature control probe (not shown in the figure). The temperature control probe is a calibrated standard thermometer, which can be used to calibrate other temperature probe. Because the bottom of the hole 16 is very close to the radiative source, the temperature difference of the temperature control probe and the radiative source can be ignored.

Several holes are drilled around the center of the metallic cylinder 11, as shown in FIG. 2. The depths of holes 29, 15, 17 and 21 are about one half to three-fourths of the length of the metallic cylinder 11. The diameters of the holes could be different for insertion of various sizes of temperature probe to be calibrated.

When calibrating non-contact thermometers, the temperature control probe is inserted in the hole 16. The temperature feedback point is very close to metallic cylinder surface 18. When calibrating contact thermometers, the temperature control sensor rod is inserted in the hole 21. The diameters of the hole 21 and hole 16 are the same.

The calibrator of the present invention further comprises: heating device 12 enclosing the metallic cylinder 11 for performing as heat source to heat the metallic cylinder 11, thermal insulating layer 13 enclosing the heating device 12 for preventing heat loss to save power; and housing 14 for fixing the metallic cylinder 11 and the thermal insulating layer 13. The housing 14 also provides effect to enhance the delicacy of the calibrator. The calibrator could be placed horizontally or vertically. When the calibrator is placed vertically, the radiative source on the metallic cylinder surface 18 is downward.

When calibrating non-contact thermometers, the present invention is placed horizontally while when calibrating contact thermometers, it is placed vertically. The heat would flow upwards when the calibrator is placed horizontally. This makes the temperature of the upper part of the metallic cylinder 11 higher than that of the lower part, that is, the temperature of the hole 15 as shown in FIG. 1 is slightly higher than that of the hole 17. In order to preclude such nonuniformity in temperature, when calibrating contact thermometers, the calibrator should be placed vertically. In addition, the temperature control probe should be inserted in the hole 21. The temperatures at the bottoms of the holes are very close because the holes are axially symmetric and the depths of the holes are the same.

This invention is in no way limited to the example described hereinbefore. Various modifications of the disclosed embodiment, as well as other embodiments of the invention, will become apparent to persons skilled in the art with reference to the description of the invention. It is therefore contemplated that the appended claims will cover any such modifications or embodiments as falling within the true scope of the invention.

What is claimed is:

1. A calibrator for contact and non-contact thermometers, comprising:

a metallic body comprising two opposite end surfaces, wherein at least a first type of hole which is drilled into the metallic body for the insertion of a temperature control probe, and at least a second type of hole for the insertion of a temperature probe are located on one end surface; and the other end surface is coated with a heat resistant and high emissivity material to perform as a radiative source; when used with the non-contact thermometers a heating device, for heating the metallic body; and a temperature control device, for controlling the heating power of the heating device and for controlling the temperature of the metallic body.

2. The calibrator of claim 1, in which the first type of hole is located in the center of the one end surface.

3. The calibrator of claim 1, in which the depth of the first type of hole is close to the length of the metallic body.

4. The calibrator of claim 2, in which the depth of the first type of hole is close to the length of the metallic body.

5. The calibrator of claim 1, in which the bottom of the first type of hole is about 1 to 7 mm away from the other end surface.

6. The calibrator of claim 1, in which the metallic body is a cylinder.

7. The calibrator of claim 1, in which the depth of the second type of hole is one-third to three-fourths of the length of the metallic body.

8. The calibrator of claim 1, further comprising a thermal insulating layer around the heating device.

9. The calibrator of claim 1, further comprising a housing to house the metallic body.

* * * * *

UNITED STATES PATENT AND TRADEMARK OFFICE
CERTIFICATE OF CORRECTION

PATENT NO. : 6,193,411 B1  
DATED : February 27, 2001  
INVENTOR(S) : Shen-Jen Chen Page 1 of 1

It is certified that error appears in the above-identified patent and that said Letters Patent is hereby corrected as shown below:

<u>Column 1,</u>
Line 31, change "double-ditty" to -- double-duty --;

<u>Column 2,</u>
Lines 26-27, after "control device" delete "(not shown in the figure)" and insert -- 23 -- therefor;
Line 30, change "22" to -- 24 -- and after "source" insert -- 24 --;
Line 35, after "source" insert -- 24 --;

<u>Column 4,</u>
Line 5, after "source" delete ";"; and
Lines 5-6, after "thermometers" insert -- ; --.

Signed and Sealed this

Twenty-fifth Day of December, 2001

*Attest:*

*Attesting Officer*

JAMES E. ROGAN
*Director of the United States Patent and Trademark Office*